US007053792B2

(12) United States Patent
Aoki et al.

(10) Patent No.: US 7,053,792 B2
(45) Date of Patent: May 30, 2006

(54) MONITORING SYSTEM FOR AUTOMATIC CHARGING APPARATUS FOR VEHICLE

(75) Inventors: Yasuyuki Aoki, Nagoya (JP); Masaki Kakihara, Yokohama (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/381,745

(22) PCT Filed: Sep. 28, 2001

(86) PCT No.: PCT/JP01/08503

§ 371 (c)(1),
(2), (4) Date: Jul. 14, 2003

(87) PCT Pub. No.: WO02/29729

PCT Pub. Date: Apr. 11, 2002

(65) Prior Publication Data

US 2004/0098301 A1 May 20, 2004

(30) Foreign Application Priority Data

Sep. 29, 2000 (JP) ............................ 2000-299552

(51) Int. Cl.
*G07B 15/00* (2006.01)
*G08G 1/00* (2006.01)
*G06F 17/60* (2006.01)

(52) U.S. Cl. ......................... 340/928; 705/13; 235/384

(58) Field of Classification Search ................ 340/928, 340/933, 937; 235/384; 701/117, 213–216; 705/13

See application file for complete search history.

(56) References Cited

U.S. PATENT DOCUMENTS

| | | | | | |
|---|---|---|---|---|---|
| 5,705,996 | A * | 1/1998 | Eguchi et al. | .............. | 340/928 |
| 5,777,565 | A * | 7/1998 | Hayashi et al. | ............. | 340/928 |
| 5,805,082 | A * | 9/1998 | Hassett | ........................ | 340/928 |
| 6,042,008 | A * | 3/2000 | Ando et al. | ................. | 340/933 |
| 6,252,523 | B1 * | 6/2001 | Mostrom | ..................... | 340/928 |
| 6,388,581 | B1 * | 5/2002 | Barker et al. | ............... | 340/928 |
| 2001/0025251 | A1 * | 9/2001 | Konishi et al. | ............... | 705/13 |
| 2002/0032506 | A1 * | 3/2002 | Tokitsu et al. | ................ | 701/29 |

FOREIGN PATENT DOCUMENTS

| | | | |
|---|---|---|---|
| CN | 1202973 | A | 12/1998 |
| JP | 08-016846 | | 1/1996 |
| JP | 08-202907 | * | 8/1996 |
| JP | 11-306402 | | 11/1999 |
| WO | WO 99/66455 | | 12/1999 |

* cited by examiner

*Primary Examiner*—Jeffery Hofsass
*Assistant Examiner*—Anne V. Lai
(74) *Attorney, Agent, or Firm*—Pillsbury Winthrop Shaw Pittman LLP

(57) ABSTRACT

When a monitor apparatus judges that a vehicle has stopped at a predetermined position (step 705), the monitor apparatus transmits pseudo position information of the vehicle (dummy data) to an automatic charging apparatus (step 725). The automatic charging apparatus calculates a charge amount on the basis of the dummy data, and transmits the result of the calculation to the monitor apparatus. The monitor apparatus receives the result (step 735) and judges on the basis of the result whether the automatic charging apparatus is in an anomalous state (step 740). Since the above-described successive operations are performed only when the vehicle stays, the status of another automatic charging apparatus not monitored is not misidentified as the status of an automatic charging apparatus to be monitored.

20 Claims, 8 Drawing Sheets

MONITORING SYSTEM FOR AUTOMATIC CHARGING APPARATUS FOR VEHICLE

This application is the National Phase of International Application PCT/JP01/08503 filed Sep. 28, 2001 which designated the U.S. and that International Application was not published under PCT Article 21(2) in English.

TECHNICAL FIELD

The present invention relates to a monitoring system for an automatic charging apparatus for a vehicle which is mounted on the vehicle and adapted to calculate amounts of money to be charged to the vehicle on the basis of at least position information representing position of the vehicle, as well as to the automatic charging apparatus itself and to a monitor apparatus used in the monitoring system.

BACKGROUND ART

There has conventionally been known an automatic charging system which includes an automatic charging apparatus which is mounted on a vehicle and adapted to operate as follows. The apparatus obtains position information representing position of the vehicle by use of, for example, GPS and on the basis of the position information judges (determines) whether the vehicle has entered a charged area. When the vehicle is judged to have entered the charged area, the apparatus calculates a charge amount, and subtracts the calculated charge amount from the balance of a prepaid card, an IC card, or a like card, to thereby collect a toll or a like fee.

In such system, an important factor is that the automatic charging apparatus function properly. In view of this, Japanese Patent Application Laid-Open (kokai) No. 11-306402 discloses a system including an automatic charging apparatus configured to cause a light emitting element or a like element to blink in a special pattern or configured to change the frequency or the like of a radio wave to be transmitted in a special pattern so as to communicate to the outside the state of charging; and a monitor apparatus which detects the blinking of the light emitting element, for example, and judges on the basis of the detection result whether the automatic charging apparatus functions properly.

However, in the conventional system, the detection of the pattern of blinking of the light emitting element or the detection of the frequency, for example, of the radio wave is performed while the vehicle travels. Therefore, there is a possibility that a normal automatic charging apparatus is misidentified as an anomalous automatic charging apparatus of another vehicle.

DISCLOSURE OF THE INVENTION

The present invention has been accomplished in order to cope with the above-described problems, and one feature of the present invention resides in a system for monitoring an automatic charging apparatus for a vehicle, comprising an automatic charging apparatus which is mounted on the vehicle and includes charge-amount calculation means for calculating amount to be charged to the vehicle on the basis of at least position information representing position of the vehicle; and a monitor apparatus disposed on the ground and adapted to monitor a status of the automatic charging apparatus, wherein the automatic charging apparatus and the monitor apparatus are configured to communicate with each other; the automatic charging apparatus includes transmission means for transmitting, to the outside of the vehicle, information corresponding to the internal status of the automatic charging apparatus; and the monitor apparatus includes anomaly judgment means for judging whether the automatic charging apparatus is in an anomalous state, on the basis of information transmitted from the transmission means of the automatic charging apparatus only when the vehicle stays at a predetermined position.

By virtue of this configuration, the judgment as to whether the automatic charging apparatus is in an anomalous state is performed on the basis of information which represents the internal status of the automatic charging apparatus and is transmitted from the transmission means of the automatic charging apparatus only when the vehicle stays at the predetermined position. Therefore, the monitor apparatus hardly misidentifies, as information of an automatic charging apparatus to be monitored, information corresponding to the internal status of an automatic charging apparatus of another vehicle which is different from the vehicle on which the automatic charging apparatus to be monitored is mounted. Therefore, judgment as to presence/absence of anomaly in the automatic charging apparatus can be performed reliably.

In this case, the anomaly judgment means of the monitor apparatus preferably includes vehicle-stoppage judgment means for judging whether the vehicle has stopped at the predetermined position. The vehicle-stoppage judgment means may be means for analyzing an image of the vehicle photographed by use of a camera (including a digital camera and/or a video camera) to thereby judge whether the vehicle has stopped at the predetermined position; means for transmitting a code to the automatic charging apparatus and judging whether the vehicle has stopped at the predetermined position, on the basis of the result of a judgment as to whether a response signal generated by the automatic charging apparatus for the code has been received (within a predetermined period of time after transmission of the code); or means for detecting positional change of the vehicle by use of an ultrasonic sensor or the like to thereby judge whether the vehicle has stopped at the predetermined position.

In this case, preferably, the transmission means of the automatic charging apparatus is configured to receive predetermined information transmitted from the monitor apparatus and transmit to the monitor apparatus information which relates to the result of calculation performed on the basis of the received information and serves as information representing the internal status of the automatic charging apparatus; and the anomaly judgment means of the monitor apparatus is configured to transmit the predetermined information to the automatic charging apparatus, receive the information transmitted from the transmission means of the automatic charging apparatus and relating to the result of the calculation, and judge whether the automatic charging apparatus is in an anomalous state on the basis of the received information relating to the result of the calculation.

Since monitoring is performed while the vehicle is in a stopped state, it becomes possible to cause the automatic charging apparatus to perform complex calculation which requires a relatively long calculation time, and judge whether the automatic charging apparatus is in an anomalous state on the basis of the result of the calculation. Therefore, accuracy of the judgment as to presence/absence of anomaly can be improved further. Moreover, since the predetermined information which is transmitted from the monitor apparatus to the automatic charging apparatus can be changed, an anomalous state of the automatic charging apparatus caused by altering of the automatic charging apparatus can be detected more accurately, because when the automatic charging apparatus is altered, correct calculation is difficult to be performed for new information.

In this case, preferably, the charge-amount calculation means of the automatic charging apparatus is configured to calculate the above-described charge amount on the basis of pseudo position information transmitted from the monitor apparatus and representing position of the vehicle; the transmission means of the automatic charging apparatus is configured to transmit to the monitor apparatus information which relates to the result of calculation of the charge amount performed on the basis of the pseudo position information and serves as information representing the internal status of the automatic charging apparatus; and the anomaly judgment means of the monitor apparatus is configured to transmit the pseudo position information to the automatic charging apparatus, receive the information transmitted from the transmission means of the automatic charging apparatus and relating to the result of the calculation, and judge whether the automatic charging apparatus is in an anomalous state on the basis of the received information relating to the result of the calculation.

Since monitoring is performed while the vehicle is in a stopped state, the judgment as to whether the automatic charging apparatus is in an anomalous state can be performed on the basis of the result of a judgment as to whether the automatic charging apparatus properly performs charge-amount calculation, which requires a relatively long calculation time and is the most important function of the automatic charging apparatus. Further, since the pseudo information which is transmitted from the monitor apparatus to the automatic charging apparatus can be changed, an anomalous state caused by altering of the automatic charging apparatus can be detected more accurately, because when the automatic charging apparatus is altered, correct calculation becomes difficult to perform for new pseudo position information.

Another feature of the present invention resides in a system for monitoring an automatic charging apparatus for a vehicle, comprising an automatic charging apparatus which is mounted on the vehicle and includes charge-amount calculation means for calculating amount to be charged to the vehicle on the basis of at least position information representing position of the vehicle; and a monitor apparatus disposed on the ground and adapted to monitor a status of the automatic charging apparatus, wherein the automatic charging apparatus and the monitor apparatus are configured to communicate with each other; the charge-amount calculation means of the automatic charging apparatus receives pseudo position information transmitted from the monitor apparatus and representing position of the vehicle, calculates the above-described charge amount on the basis of the received pseudo position information, and transmits to the monitor apparatus information which relates to the result of the calculation; and the anomaly judgment means of the monitor apparatus transmits the pseudo position information to the automatic charging apparatus, receives the information transmitted from the automatic charging apparatus and relating to the result of the calculation, and judges whether the automatic charging apparatus is in an anomalous state on the basis of the received information relating to the result of the calculation.

In this case, the monitor apparatus transmits to the automatic charging apparatus the pseudo position information which represents the position of the vehicle; and the automatic charging apparatus calculates a charge amount on the basis of the pseudo position information which is transmitted from the monitor apparatus and represents position of the vehicle, and transmits to the monitor apparatus information regarding the calculation result. Subsequently, on the basis of the information transmitted from the automatic charging apparatus and relating to the result of the calculation, the monitor apparatus judges whether the automatic charging apparatus is in an anomalous state. As a result, it is possible to judge whether the automatic charging apparatus is in an anomalous state, on the basis of the result of a judgment as to whether the automatic charging apparatus properly performs charge-amount calculation, which is the most important function of the automatic charging apparatus. Further, since the pseudo information which is transmitted from the monitor apparatus to the automatic charging apparatus can be changed, an anomalous state of the automatic charging apparatus caused by altering of the automatic charging apparatus can be detected more accurately, because when the automatic charging apparatus is altered, correct calculation becomes difficult to perform for new pseudo information.

In this case, the anomaly judgment means is preferably configured to judge that the automatic charging apparatus is in an anomalous state when the anomaly judgment means does not receive the information transmitted from the automatic charging apparatus and relating to the result of the calculation, before a predetermined period of time elapses after transmission of pseudo position information representing position of the vehicle.

The above-described configuration is effective, because the automatic charging apparatus may be in an anomalous state when the anomaly judgment means does not receive the information transmitted from the automatic charging apparatus and relating to the result of the calculation, before a predetermined period of time elapses after transmission of pseudo position information representing position of the vehicle.

In each of the above-described cases, the monitor apparatus preferably includes report means for reporting information regarding the vehicle to the outside when the monitor apparatus judges that that the automatic charging apparatus is in an anomalous state.

Since this configuration enables the management center or the like to identify a vehicle whose automatic charging apparatus is in an anomalous state, such vehicles can be managed in a centralized manner.

Other features of the present invention reside in the automatic charging apparatus and the monitor apparatus which constitute the above-described system.

One embodiment of the monitoring system for an automatic charging apparatus for a vehicle according to the present invention will be described with reference to the drawings.

BEST MODE FOR CARRYING OUT THE INVENTION

Figure 1:
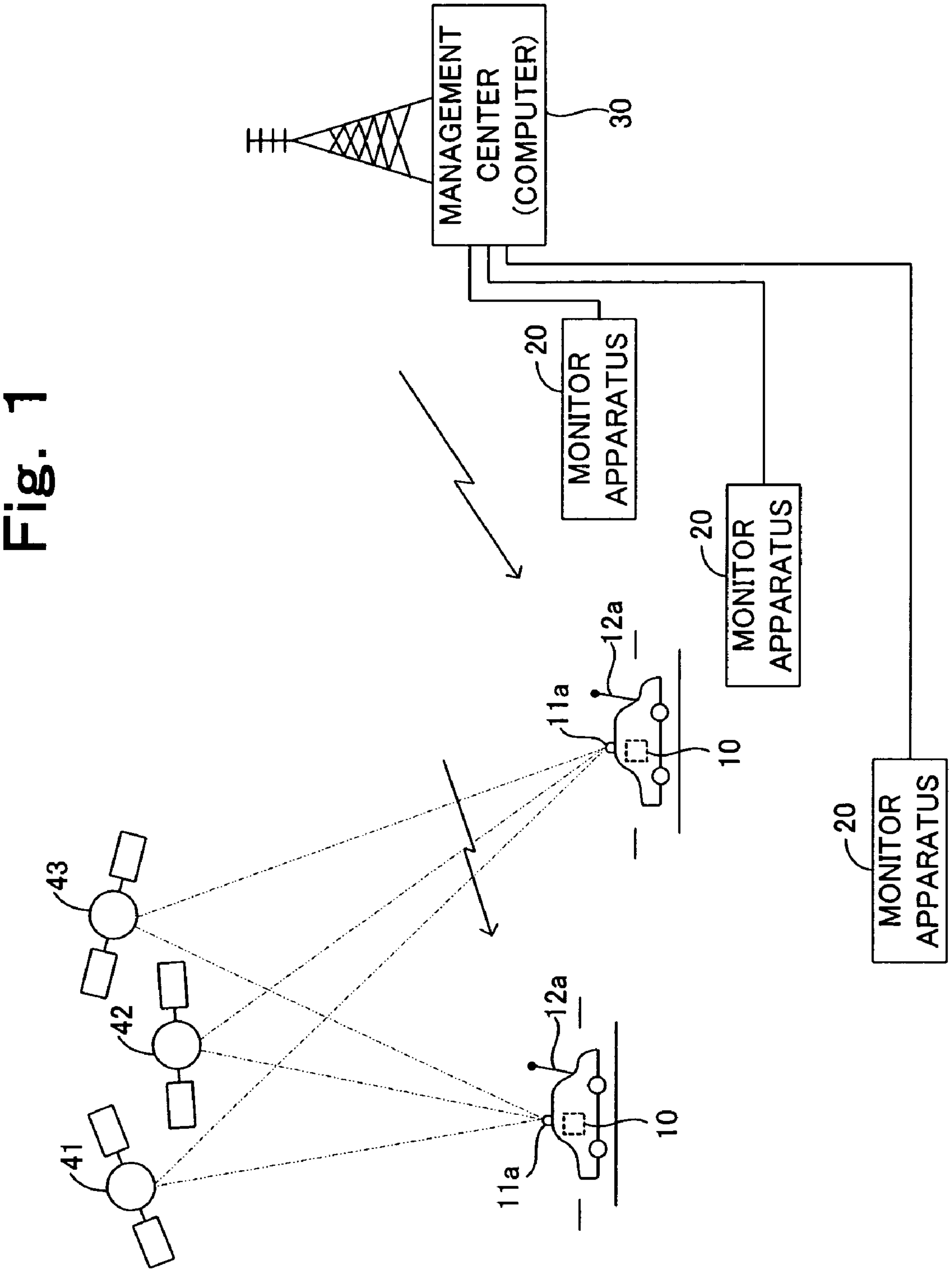
FIG. 1 is a conceptual view showing the entirety of a monitor system for an automatic charging apparatus for a vehicle according to the present invention.

FIG. 1 is a conceptual view showing the entire configuration of a system for monitoring an automatic charging apparatus for a vehicle according to an embodiment of the present invention. The monitor system includes an automatic charging apparatus mounted on each vehicle (an on-vehicle apparatus) 10; a monitor apparatus 20 disposed at an appropriate location (e.g., a gas station or a repair shop) on the ground; and a management center 30 connected to the monitor apparatus 20 in a communicatable manner.

Figure 2:
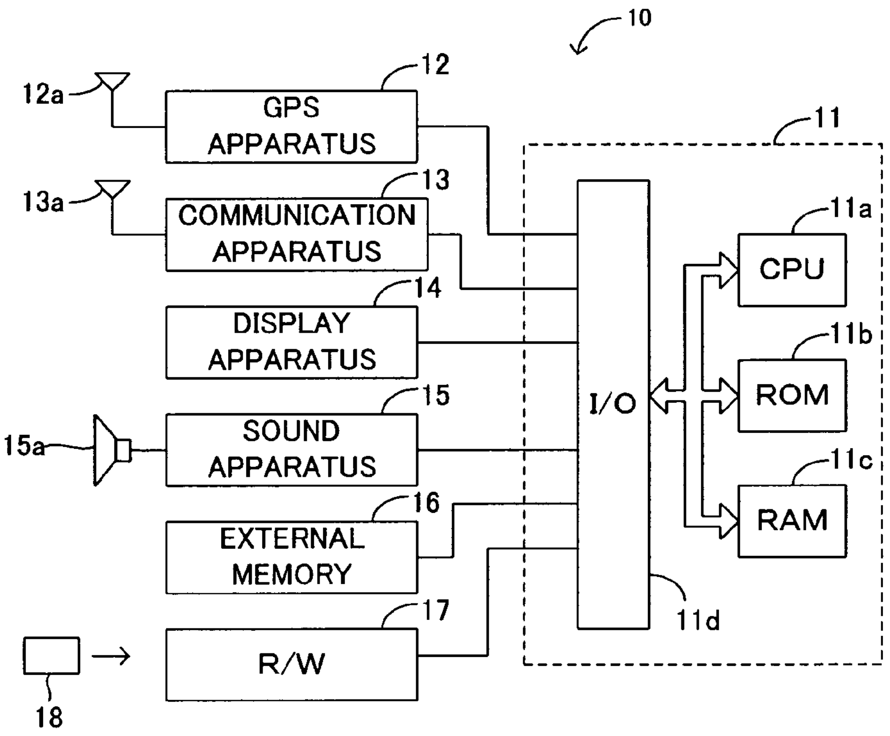
FIG. 2 is a block diagram showing the configuration of the automatic charging apparatus shown in FIG. 1.

As shown in FIG. 2, the automatic charging apparatus 10 is mainly composed of a microcomputer 11. The microcomputer 11 includes a CPU 11*a*, ROM 11*b*, RAM 11*c*, and an input/output interface 11*d*, which are connected with one another via a bus. The CPU 11*a* executes a program (routine) stored in the ROM 11*b*, which will be described later, while using the data storage function of the RAM 11*c*.

The automatic charging apparatus 10 includes a GPS apparatus 12, a communication apparatus 13, a display apparatus 14, a sound apparatus 15, an external memory 16 such as a hard disk drive, and a read/write apparatus 17, which are connected to the input/output interface 11*d* in such a manner as to enable exchange of signals with the microcomputer 11.

The GPS apparatus 12 is connected to an antenna 12*a* for receiving GPS signals from GPS satellites 41, 42, and 43 shown in FIG. 1. The GPS apparatus 12 specifies the position of the vehicle on the basis of the GPS signals which are received by the antenna 12*a* at predetermined intervals (e.g., 1 sec). Subsequently, the GPS apparatus 12 transmits to the microcomputer 11 data (vehicle position information) representing the thus-specified vehicle position. Notably, the vehicle position is determined by longitude x and latitude y.

The communication apparatus 13 is connected to an antenna 13*a* for ground waves and adapted to receive signals from the center 30 shown in FIG. 1, and exchanges information with the monitor apparatus 20 by means of radio. The display apparatus 14 includes an unillustrated display and is adapted to display necessary information in accordance with an instruction signal from the microcomputer 11. The sound apparatus 15 is connected to a speaker 15*a* and is adapted to generate necessary sound in accordance with an instruction from the microcomputer 11.

The external memory 16 is composed of a hard disk drive, MO, etc. and is adapted to supply necessary information (data, program, etc.) to the microcomputer 11 and stores necessary information in accordance with an instruction from the CPU 11*a*. In accordance with instructions from the microcomputer 11, the read/write apparatus 17 reads necessary information, such as balance information, from a prepaid card 18, which is inserted into the read/write apparatus 17, and writes necessary information to the prepaid card 18. Notably, instead of the prepaid card 18, an information recording medium which is readable and writable, such as an IC card, may be used.

Figure 3:
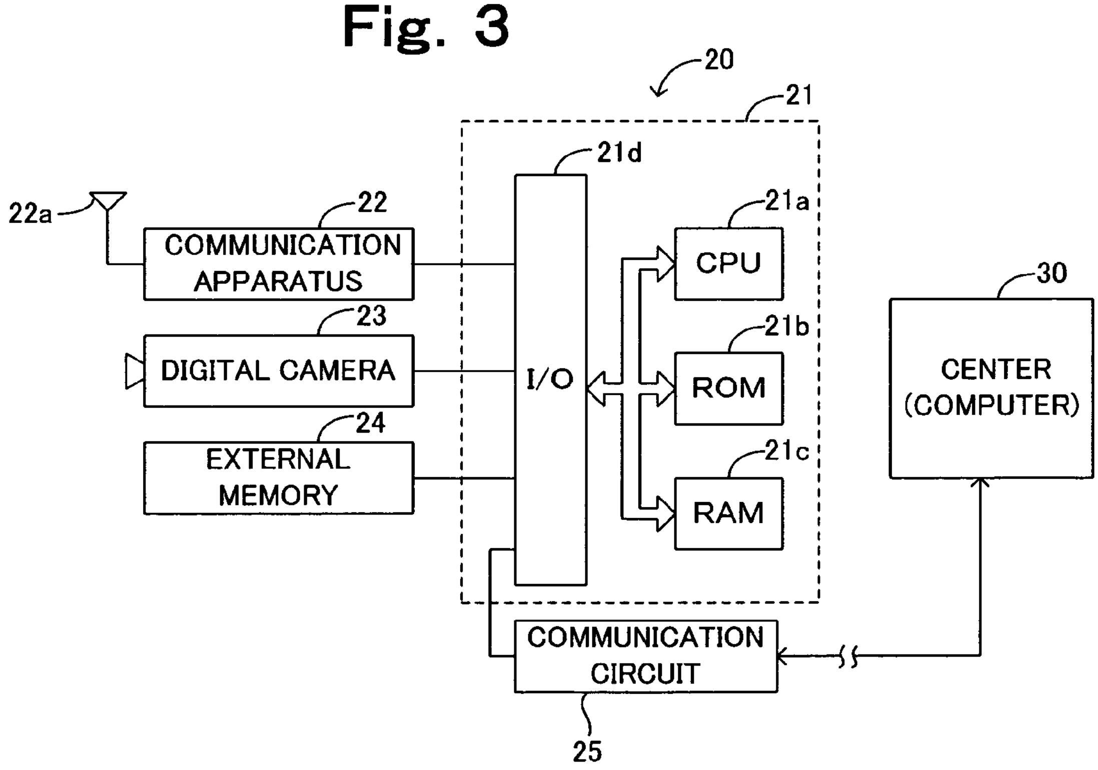
FIG. 3 is a block diagram showing the configuration of the monitor apparatus shown in FIG. 1.

As shown in FIG. 3, the monitor apparatus 20 is mainly composed of a microcomputer 21. The microcomputer 21 includes a CPU 21*a*, ROM 21*b*, RAM 21*c*, and an input/output interface 21*d*, which are connected with one another via a bus. The CPU 21*a* executes a program (routine) stored in the ROM 21*b*, which will be described later, while using the data storage function of the RAM 21*c*.

The monitor apparatus 20 further includes a communication apparatus 22, a digital camera 23, an external memory 24 such as a hard disk drive, and a communication circuit 25 for communicating with the management center 30 shown in FIG. 1. These devices and circuit are connected to the input/output interface 21*d* in such a manner as to enable exchange of signals with the microcomputer 21.

Figure 4:
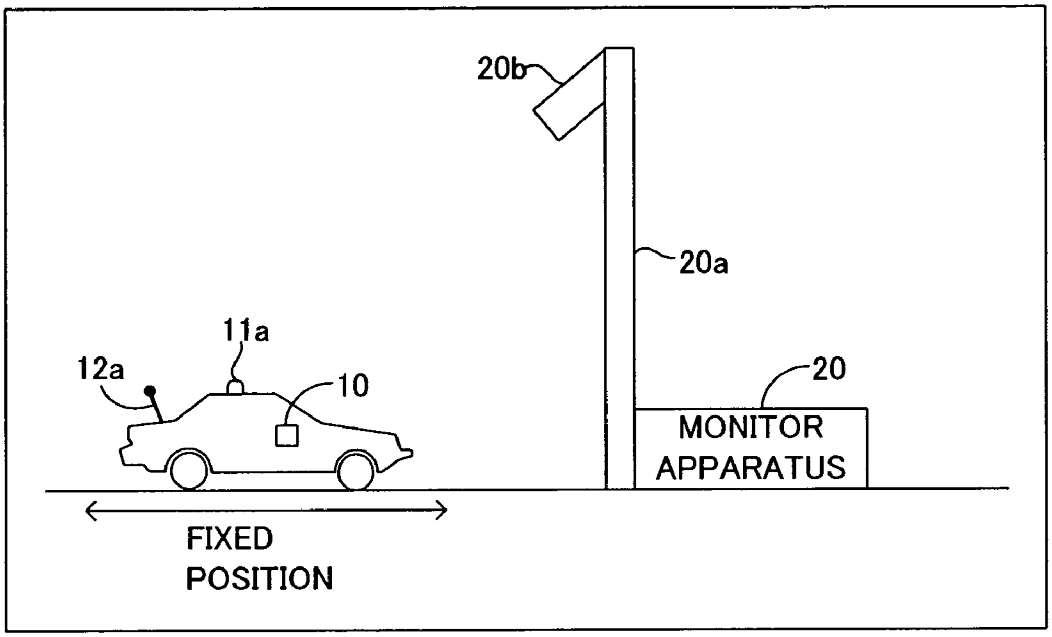
FIG. 4 is a diagram showing the positional relation between the vehicle and the monitor apparatus when the automatic charging apparatus is monitored.

The communication apparatus 22 is connected to an antenna 22*a* for ground waves and adapted to communicate with the automatic charging apparatus 10. In accordance with an instruction from the microcomputer 21, the digital camera 23 fetches image data (i.e., photographs an object) and transmits the image data to the microcomputer 21. The antenna 22*a* of the communication apparatus and the digital camera 23 are disposed within a hood 20*b* attached to the top of a post 20*a* provided adjacent to the monitor apparatus 20, as shown in FIG. 4. The external memory 24 is composed of a hard disk drive, MO, etc. and is adapted to supply necessary information (data, program, etc.) to the microcomputer 21 and stores necessary information in accordance with an instruction from the CPU 21*a*.

Next, operation of the monitor system for the automatic charging apparatus having the above-described configuration will be described. First, charge processing which the automatic charging apparatus 10 performs in an ordinary state will be described.

Figure 5:
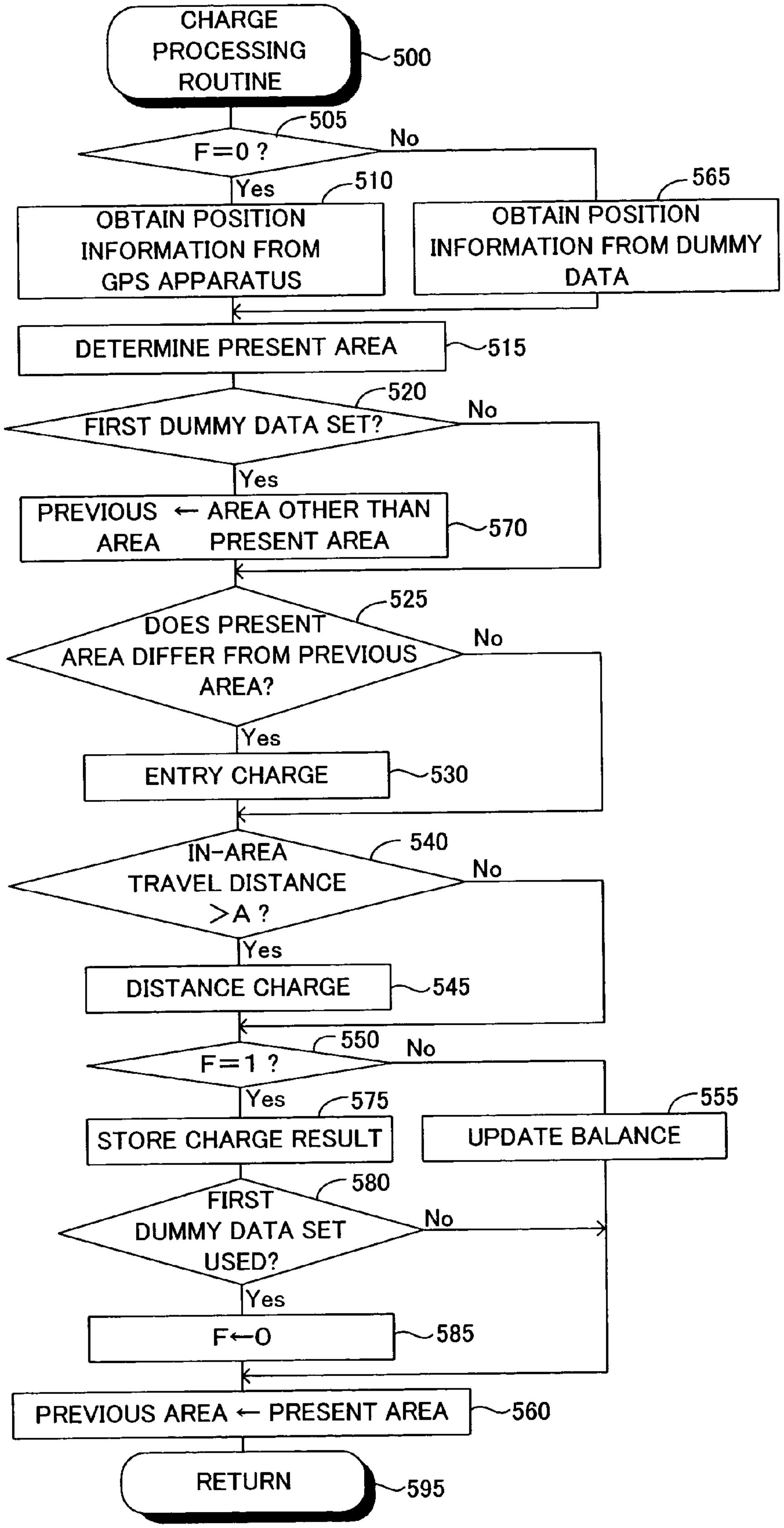
FIG. 5 is a flowchart showing a charge processing routine (program) executed by the CPU of the automatic charging apparatus shown in FIG. 2.

In response to insertion of the prepaid card 18 into the read/write apparatus 17, the CPU 11*a* starts the charge processing routine of FIG. 5 from step 500 at predetermined intervals. After having proceeded to step 505, the CPU 11*a* judges whether the value of a flag F is "0." The value of the flag F is maintained at "0" in an ordinary state, but is changed to "1" by means of a diagnosis calculation start routine, which will be described later. Accordingly, in this case, the result of the judgment in step 505 becomes "Yes," and in step 510 the CPU 11*a* obtains position of the vehicle (vehicle position information) from the GPS apparatus 12.

Figure 6:
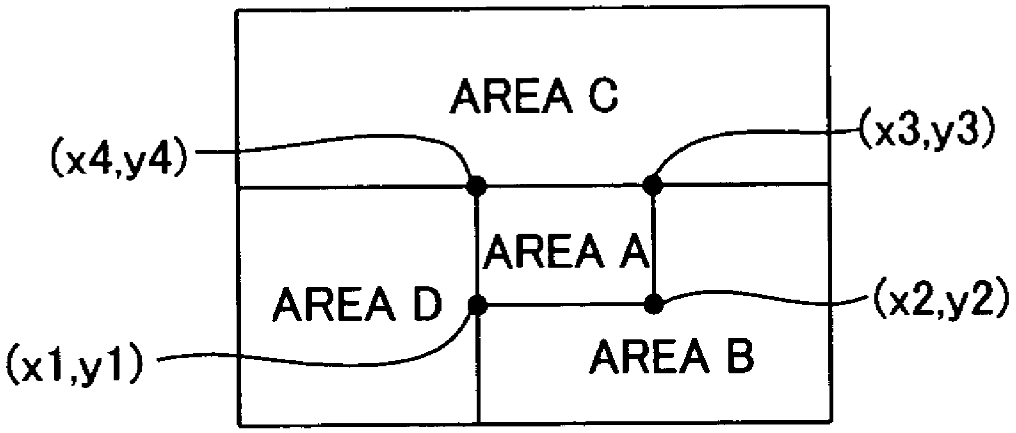
FIG. 6 is a diagram used for describing a method for specifying a charged area.

Subsequently, the CPU 11*a* proceeds to step 515 and determines a present area (charged area) in which the vehicle is present, from the position information obtained from the GPS apparatus 12 and information (area information) in relation to longitude x and latitude y which is stored in the external memory 16 and used for specifying each area. As shown in FIG. 6, each area is defined by means of a plurality of points, each specified by longitude x and latitude y. For example, area A is defined by four points having the following values of longitude x and latitude y: (x1, y1), (x2, y2), (x3, y3), and (x4, y4).

Next, after having proceeded to step 520, the CPU 11*a* judges whether a first dummy data set (data of pseudo position information) has been used in the above-described step 515. Since dummy data are data which are transmitted from the monitor apparatus during monitoring (which will be described later), the first dummy data set has not yet been used at this point in time. Accordingly, the result of the judgment in step 520 becomes "No," and the CPU 11*a* proceeds to step 525. In step 525, the CPU 11*a* judges whether the present area in which the vehicle is present differs from the area in which the vehicle was present when the present routine was last performed.

When the vehicle has entered a new charged area as the result of traveling, the result of the judgment in step 525 becomes "Yes," and the CPU 11*a* proceeds to step 530. In step 530, the CPU 11*a* performs entry charge processing on the basis of the fact that the vehicle has entered the new area. Specifically, the automatic charging apparatus 10 stores in the external memory 16 entry charge information shown in Table 1. The entry charge information includes a charge amount for each of combinations of information items, including entered area, time zone, and vehicle type (size; e.g., large, medium, compact). The CPU 11*a* determines a charge amount with reference to data corresponding to the information items at the present time and the corresponding charge information, and stores the determined charge amount in the RAM 11*c*. When the vehicle has not entered a new charged area, the result of the judgment in step 525 becomes "No," and the CPU 11*a* proceeds to step 540.

TABLE 1

| Entered area | Time zone Type | 19:00–07:00 | 07:00–09:00 | 09:00–17:00 | 17:00–19:00 |
|---|---|---|---|---|---|
| Area A | Small | 100 yen | 200 yen | 100 yen | 100 yen |
| | Medium | 150 yen | 300 yen | 150 yen | 150 yen |
| | Large | 200 yen | 400 yen | 200 yen | 200 yen |
| Entered area | Time zone Type | 19:00–07:00 | 07:00–09:00 | 09:00–17:00 | 17:00–19:00 |
| Area B | Small | 150 yen | 200 yen | 100 yen | 100 yen |
| | Medium | 150 yen | 300 yen | 200 yen | 150 yen |
| | Large | 200 yen | 400 yen | 200 yen | 150 yen |
| . | . | . | . | . | . |
| . | . | . | . | . | . |
| . | . | . | . | . | . |

Subsequently, in step 540, the CPU 11*a* judges whether an in-area travel distance is greater than a predetermined reference value A. The in-area travel distance is the total distance that the vehicle has traveled continuously within the same area. The in-area travel distance is calculated on the basis of the above-described vehicle position information and by means of an unillustrated routine performed by the CPU 11*a*.

When the vehicle has traveled over a distance greater than the predetermined distance A within the same area, the result of the judgment in step 540 becomes "Yes," and the CPU 11*a* proceeds to step 545. In step 545, the CPU 11*a* performs processing for charging in accordance with distance (distance charge). Specifically, the automatic charging apparatus 10 stores in the external memory 16 unit-distance charge information shown in Table 2. The unit-distance charge information includes a charge amount per unit distance for each of combinations of information items, including area in which the vehicle is present, time zone, and vehicle type (size; e.g., large, medium, compact). The CPU 11*a* determines a charge amount with reference to data corresponding to the information items at the present time and the corresponding unit-distance charge information, and stores the determined charge amount in the RAM 11*c*.

When the vehicle has not traveled over a distance greater than the predetermined distance A within the same area, the result of the judgment in step 540 becomes "No," and the CPU 11*a* proceeds to step 550.

TABLE 2

| Information | Contents of information Area A | | | | | |
|---|---|---|---|---|---|---|
| item | Large | | Medium | | Small | |
| Charged area Charge/0.5 km | First 0.5 km | After 0.5 km | First 0.5 km | After 0.5 km | First 0.5 km | After 0.5 km |
| Time zone: 07:00–09:00 | 500 yen | 450 yen | 300 yen | 250 yen | 200 yen | 150 yen |
| Time zone: 17:00–19:00 | 500 yen | 450 yen | 300 yen | 250 yen | 200 yen | 150 yen |
| Time zone: 19:00–07:00 | 400 yen | 350 yen | 200 yen | 100 yen | 100 yen | 50 yen |

In step 550, the CPU 11*a* judges whether the value of the flag F is "1." As described before, since the value of the flag F is maintained at "0," the result of the judgment in step 550 becomes "No," and the CPU 11*a* proceeds to step 555. In step 555, the CPU 11*a* subtracts from the balance of the inserted prepaid card 18 the charge amount which has been determined in the above-described steps 530 and 545 and stored in the RAM 11*c*, to thereby determine a new balance of the prepaid card 18. Subsequently, the CPU 11*a* overwrites the old balance of the prepaid card 18 with the new balance by means of the read/write apparatus 17. Subsequently, the CPU 11*a* proceeds to step 560 so as to store the present area determined in the above-described step 515, as a previous area to be used for calculation of the next time, and proceeds to step 595 so as to end the present routine. In this manner, the charge processing is performed.

Next, the operations of the respective apparatus during the course of monitoring the automatic charging apparatus 10 will be described with reference to FIG. 7, which shows a routine executed by the CPU 21*a* of the monitor apparatus 20 at predetermined intervals, as well as with reference to FIGS. 8 and 9, which show routines executed by the CPU 11*a* of the automatic charging apparatus 10 at predetermined intervals.

Figure 7:
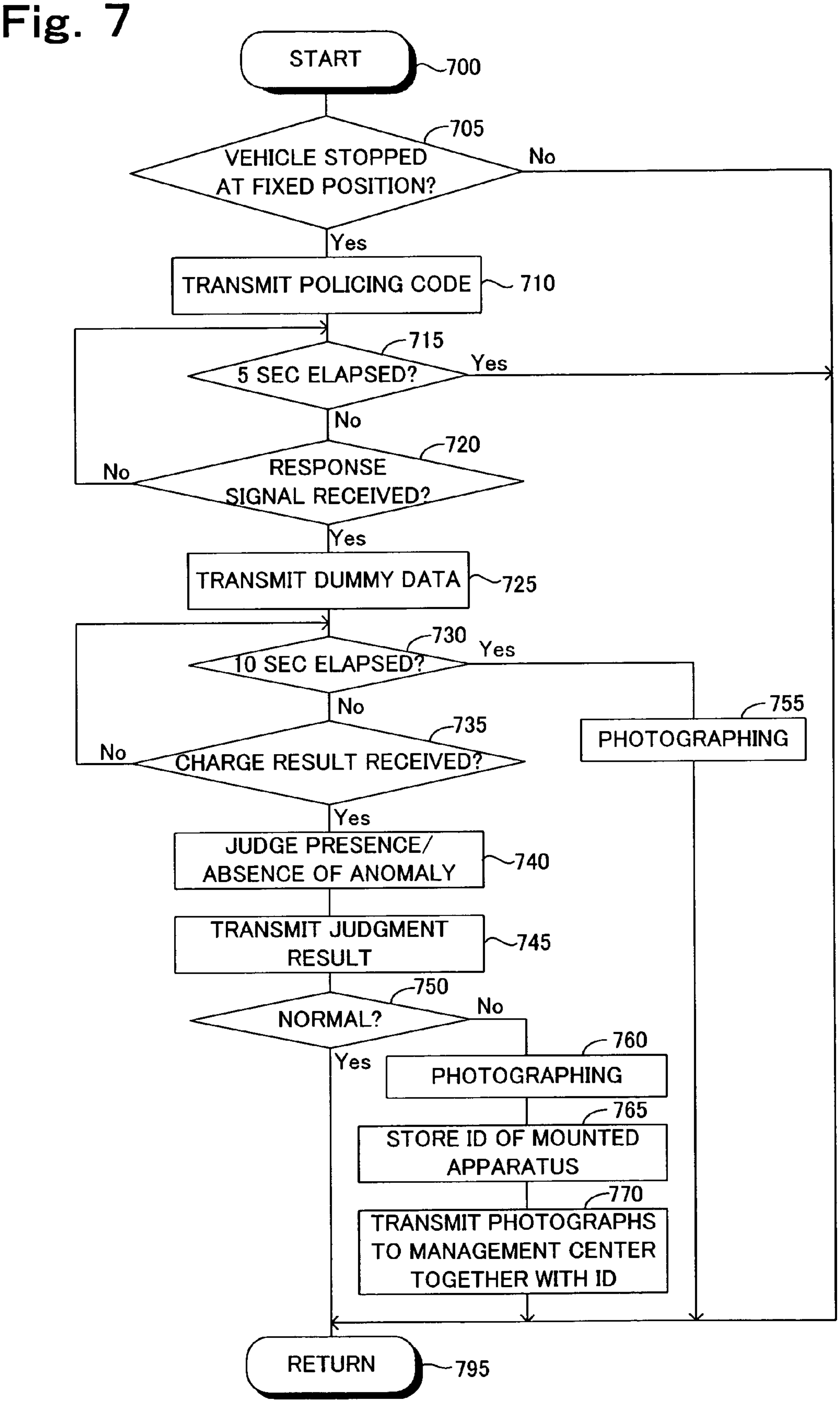
FIG. 7 is a flowchart showing a routine (program) executed by the CPU of the monitor apparatus shown in FIG. 3.

At a predetermined timing, the CPU 21*a* of the monitor apparatus 20 starts the processing of FIG. 7 from step 700 thereof. After having proceeded to step 705, the CPU 21*a* judges whether the vehicle has stopped at a fixed position (within a predetermined area), through analysis of image data transmitted from the digital camera 23. The term "fixed position" refers to an area in which the automatic charging apparatus 10 and the monitor apparatus 20 can exchange information with high reliability via their communication apparatuses 13 and 22. The fixed position may be defined as an area in which necessary images (of the vehicle, license plate, driver's seat, etc.) can be photographed by use of the digital camera 23. Notably, the processing in step 705 constitutes vehicle-stoppage judgment means for judging whether the vehicle has stopped at the predetermined position.

When the result of the judgment in step 705 is "No," the CPU 21*a* proceeds to step 795 so as to end the present routine. Subsequently, the processing in step 705 is executed every time a predetermined period of time elapses. Thus, the CPU 21*a* monitors whether the vehicle has stopped at the fixed position.

Here, it is assumed that the vehicle has stopped at the fixed position, as shown in FIG. 4, and that the automatic charging apparatus 10 functions properly. In this case, the result of the judgment in step 705 becomes "Yes," and the CPU 21*a* proceeds to step 710 so as to transmit a policing code to the automatic charging apparatus 10. By means of processing in subsequent steps 715 and 720, the CPU 21*a* judges whether a response signal has been received from the automatic charging apparatus 10 within a 5 second period subsequent to transmission of the policing code.

Figure 8:
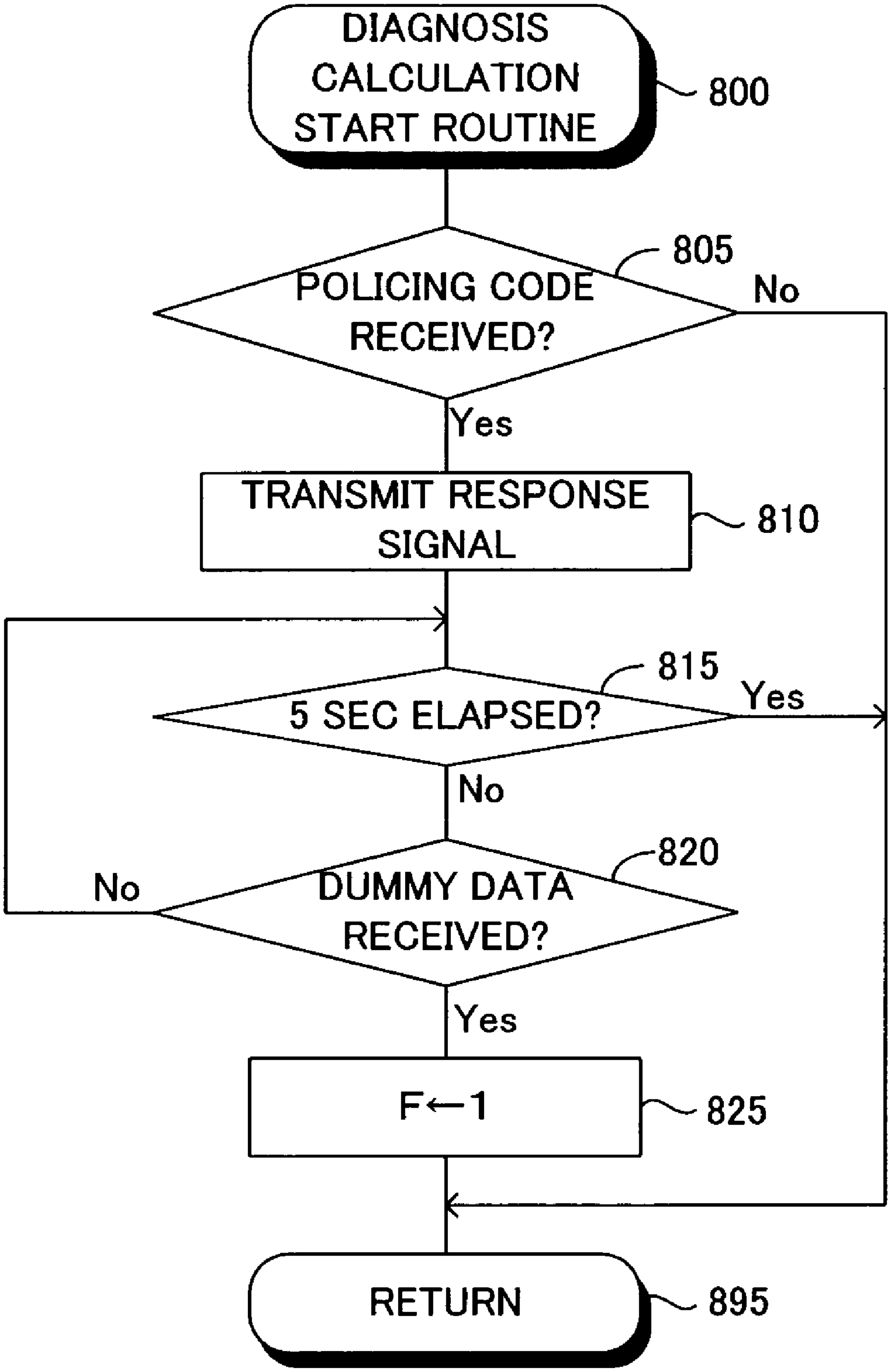
FIG. 8 is a flowchart showing a diagnosis calculation start routine (program) executed by the CPU of the automatic charging apparatus shown in FIG. 2.

Meanwhile, every time a predetermined period of time elapses, the CPU 11*a* of the automatic charging apparatus 10 executes the diagnosis calculation start routine shown in FIG. 8 from step 800 thereof. In step 805, the CUP 11*a* judges whether a policing code has been received. When the result of the judgment in step 805 becomes "Yes," the CPU 11*a* proceeds to step 810. When the result of the judgment in step 805 is "No," the CPU 11*a* proceeds to step 895 so as to end the present routine. Accordingly, when a policing code is transmitted from the monitor apparatus 20, the result of the judgment in step 805 is "Yes," and the CPU 11*a* proceeds to step 810. In step 810, the CPU 11*a* immediately transmits a response signal to the monitor apparatus 20 (within 5 seconds after transmission of the policing code). The response signal includes a special code indicating reception of a policing code, and an ID code allotted to each automatic charging apparatus 10 (specification information peculiar to the individual automatic charging apparatus 10).

As a result, the result of the judgment in step 720 of FIG. 7 becomes "Yes," and the CPU 21*a* of the monitor apparatus 20 proceeds to step 725. In step 725, the CPU 21*a* immediately transmits dummy data to the automatic charging apparatus 10. The dummy data are stored in the external memory 24 of the monitor apparatus 20 and, as shown in Table 3, include date and time (unit: sec), longitude x, latitude y, and supplementary information. In this case, the supplementary information (S.I.) includes information for indicating whether each dummy data set is the first or last data set. The supplementary information is added to relevant data sets only.

TABLE 3

| Month | Date | Hr | Min | Sec | Position (longitude) | Position (latitude) | S.I. |
|---|---|---|---|---|---|---|---|
| 08 | 30 | 14 | 01 | 00 | 135-30-00.00 | 35-00-00.00 | First |
| 08 | 30 | 14 | 01 | 01 | 135-30-00.01 | 35-00-00.50 | |
| 08 | 30 | 14 | 01 | 02 | 135-30-00.01 | 35-00-01.00 | |
| 08 | 30 | 14 | 01 | 03 | 135-30-00.01 | 35-00-01.50 | |
| 08 | 30 | 14 | 01 | 04 | 135-30-00.00 | 35-00-02.00 | |
| . | . | . | . | . | . | . | |
| . | . | . | . | . | . | . | |
| . | . | . | . | . | . | . | |
| 08 | 30 | 14 | 05 | 10 | 135-30-01.00 | 35-00-16.01 | |
| 08 | 30 | 14 | 05 | 11 | 135-30-01.01 | 35-00-16.44 | |
| 08 | 30 | 14 | 05 | 12 | 135-30-01.01 | 35-00-16.98 | |
| 08 | 30 | 14 | 05 | 13 | 135-30-01.01 | 35-00-17.50 | |
| 08 | 30 | 14 | 05 | 14 | 135-30-01.00 | 35-00-17.98 | |
| 08 | 30 | 14 | 05 | 15 | 135-30-01.00 | 35-00-18.40 | |
| 08 | 30 | 14 | 05 | 16 | 135-30-01.00 | 35-00-18.88 | |
| 08 | 30 | 14 | 05 | 17 | 135-30-01.01 | 35-00-18.88 | |
| 08 | 30 | 14 | 05 | 18 | 135-30-01.01 | 35-00-18.88 | |
| . | . | . | . | . | . | . | |
| . | . | . | . | . | . | . | |
| . | . | . | . | . | . | . | Last |

Meanwhile, by means of processing in steps 815 and 820, the CPU 11*a* of the automatic charging apparatus 10 judges whether the CPU 11*a* has received dummy data within a 5 second period subsequent to transmission of the response signal in step 810. In this case, since the dummy data have been transmitted immediately, the result of the judgment in step 820 becomes "Yes," and the CPU 11*a* proceeds 825 so as to set the value of the flag F to "1."

Figure 9:
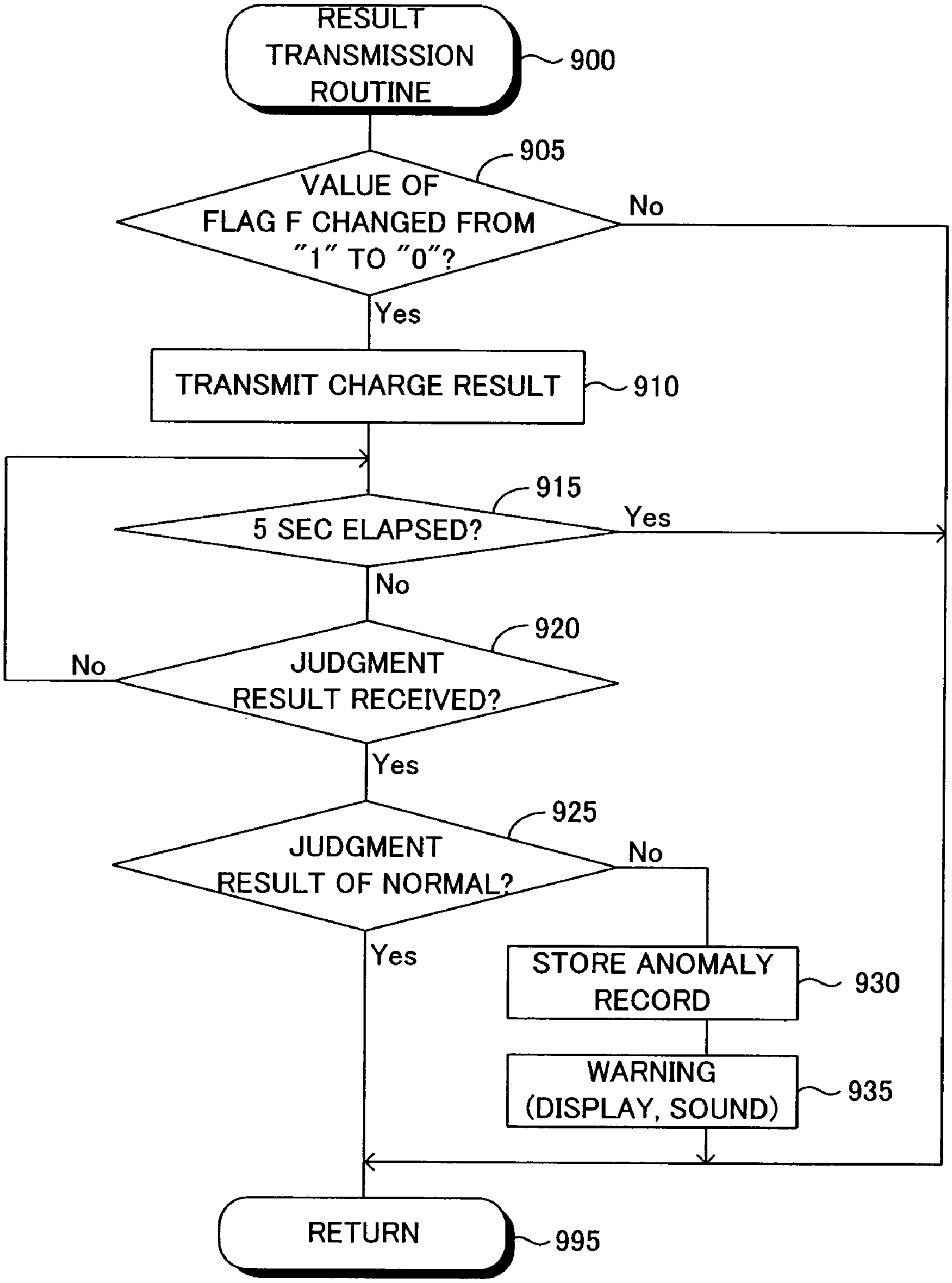
FIG. 9 is a flowchart showing a result transmission routine (program) executed by the CPU of the automatic charging apparatus shown in FIG. 2.

Meanwhile, every time a predetermined period of time elapses, the CPU 11*a* of the automatic charging apparatus 10 executes the result transmission routine shown in FIG. 9 from step 900 thereof. In step 905, the CUP 11*a* judges whether the value of the flag F has been changed from "1" to "0." When the result of the judgment in step 905 is "Yes," the CPU 11*a* proceeds to step 910. When the result of the judgment in step 905 is "No," the CPU 11*a* proceeds to step 995 so as to end the present routine. At the present point, the value of the flag F has not been changed from "1" to "0" after being changed from "0" to "1," the result of the judgment in step 905 is "No," and the CPU 11*a* proceeds to step 995 so as to end the present routine.

When the CPU 11*a* of the automatic charging apparatus 10 starts the charge processing routine shown in FIG. 5 in this state, by virtue of the value of the flag F being "1," the result of the judgment in step 505 becomes "No," and the CPU 11*a* proceeds to step 565 so as to obtain position information from the received dummy data. In step 515, the CPU 11*a* determines the present area on the basis of the obtained dummy data. In subsequent step 520, the CPU 11*a* judges whether the received dummy data are the first dummy data set. At the present point, since the first dummy data set is used, the result of the judgment in step 520 becomes "Yes," and the CPU 11*a* proceeds to step 570 so as to store, as a previous area, an appropriate (a proper) area other than the present area. This setting is performed in order to cause the entry charge processing to be executed at the time of starting use of the dummy data without fail.

In subsequent steps 525 to 545, the CPU 11*a* performs processing necessary for charging. Since the value of the flag F is "1," the result of the judgment in step 550 becomes "Yes," and the CPU 11*a* proceeds to step 575 so as to store in the RAM 11*c* or the external memory 16 the charge result which is obtained as a result of the present execution of the routine of FIG. 5 (step 530 or step 545). As shown in Table 4, the charge result includes date and time (unit: sec), longitude x, latitude y, in-area travel distance, charged area, and charge type. Notably, the charge result may include charge amount.

TABLE 4

| M | D | Hr | Min | Sec | Position (longitude) | Position (latitude) | In-area travel Distance | Area | Charge Type |
|---|---|---|---|---|---|---|---|---|---|
| 08 | 30 | 14 | 01 | 00 | 135-30-00.00 | 35-00-00.00 | 0.0 m | A | Entry |

TABLE 4-continued

| M | D | Hr | Min | Sec | Position (longitude) | Position (latitude) | In-area travel Distance | Area | Charge Type |
|---|---|---|---|---|---|---|---|---|---|
| 08 | 30 | 14 | 05 | 11 | 135-30-01.01 | 35-00-16.44 | 506.2 m | A | Distance |
| 08 | 30 | 14 | 10 | 25 | 135-30-01.52 | 35-00-32.28 | 1010.1 m | A | Distance |
| 08 | 30 | 14 | 15 | 26 | 135-30-01.27 | 35-00-35.12 | 0.0 m | B | Entry |
| 08 | 30 | 14 | 21 | 15 | 135-30-02.15 | 35-00-51.78 | 505.2 m | B | Distance |
| 08 | 30 | 14 | 30 | 37 | 135-30-02.13 | 35-01-08.11 | 1001.8 m | B | Distance |
| 08 | 30 | 14 | 36 | 47 | 135-30-02.22 | 35-01-10.05 | 0.0 m | C | Entry |
| 08 | 30 | 14 | 46 | 35 | 135-30-03.53 | 35-01-26.99 | 509.7 m | C | Distance |
| 08 | 30 | 14 | 53 | 13 | 135-30-03.12 | 35-01-43.05 | 1010.1 m | C | Distance |
| 08 | 30 | 15 | 00 | 56 | 135-30-03.25 | 35-01-58.77 | 1501 .8 m | C | Distance |
| . | . | . | . | . | . | . | . | . | . |
| . | . | . | . | . | . | . | . | . | . |
| . | . | . | . | . | . | . | . | . | . |

Subsequently, the CPU 11*a* proceeds to step 580 and judges whether the last dummy data set has been used in the above-described step 515. Since the last dummy data set has not yet been used at the present point, the result of the judgment in step 580 becomes "No," and the CPU 11*a* proceeds to step 560 and then to step 595 so as to end the present routine.

Upon elapse of the predetermined period of time, the CPU 11*a* again starts the execution of the charge processing routine from step 500 thereof. In step 565 subsequent to step 505, the CPU 11*a* obtains next position information from the dummy data, and then proceeds to step 515 and then to step 520. Since the first dummy data set has not been used in step 515 this time, the result of the judgment in step 520 becomes "No," and the CPU 11*a* proceeds to step 525 and then to subsequent steps so as to perform the above-described charge processing. Since the CPU 11*a* does not receive any policing code (no policing code is transmitted) during performance of the charge processing, the CPU 11*a* proceeds from step 800 to step 805 and then to step 895 in the routine shown in FIG. 8. Further, since the value of the flag F is maintained at "1," the CPU 11*a* proceeds from step 900 to step 905 and then to step 995, in the routine shown in FIG. 9. Meanwhile, the CPU 21*a* of the monitor apparatus 20 repeatedly performs the processing in steps 730 and 735 of FIG. 7 in order to await receipt of a charge result to be transmitted from the automatic charging apparatus 10.

When this state continues, the dummy data sets are used successively, the processing in step 530 or 545 is performed to thereby determine a charge amount, and a charge result is stored successively in step 575. When the last dummy data set has been used, the result of the judgment in step 580 becomes "Yes," and the CPU 11*a* proceeds to step 585 so as to set the value of the flag F to "0." Subsequently, the CPU 11*a* stores the present area as a previous area in step 560, and then ends the present routine in step 595.

Under this state, when the CPU 11*a* starts the processing of FIG. 9 from step 900 thereof at a predetermined timing, the result of the judgment in step 905 becomes "Yes," because the value of the flag F has been changed from "1" to "0." Therefore, the CPU 11*a* proceeds to step 910 to transmit to the monitor apparatus 20 the charge results having been stored in the RAM 11*c*. The charge results are shown in the above-described Table 4.

The period of time between the point at which the automatic charging apparatus 10 has received the dummy data and the point at which the automatic charging apparatus 10 transmits the charge results is a time that the automatic charging apparatus 10 requires to complete the pseudo charge processing for all the dummy data sets after the reception of the same and is about a few seconds (2 sec). Accordingly, the CPU 21*a* of the monitor apparatus 20, which has been awaiting the charge results through performance of the processing in steps 730 and 735, judges that the charge results have been received (the result of the judgment in step 735 becomes "Yes") and proceeds to step 740 in order to judge whether the automatic charging apparatus 10 is in an anomalous state.

Specifically, the CPU 21*a* compares the charge results which the CPU 21*a* has calculated on the basis of the dummy data which was transmitted in the above-described step 725 with the charge results which have been calculated by and transmitted from the automatic charging apparatus 10. When the charge results calculated by the CPU 21*a* are the same as the charge results transmitted from the automatic charging apparatus 10, the CPU 21*a* judges that the automatic charging apparatus 10 is normal. When the charge results calculated by the CPU 21*a* differ from the charge results transmitted from the automatic charging apparatus 10, the CPU 21*a* judges that the automatic charging apparatus 10 is in an anomalous state. Since the automatic charging apparatus 10 is normal at present, the charge results calculated by the CPU 21*a* coincide with the charge results transmitted from the automatic charging apparatus 10, and therefore, the CPU 21*a* judges that "the automatic charging apparatus 10 is normal."

Subsequently, the CPU 21*a* proceeds to step 745 and transmits the result of the judgment in step 740 to the automatic charging apparatus 10. In subsequent step 750, the CPU 21*a* judges whether the judgment result indicates "normal." In this case, since the judgment result indicates "normal," the result of the judgment in step 750 becomes "Yes," and the CPU 21*a* proceeds to step 795 so as to end the present routine.

At this time, the CPU 11*a* of the automatic charging apparatus 10 has been awaiting reception of the judgment result through performance of the processing in steps 915 and 920. Upon transmission of the judgment result from the monitor apparatus 20, the result of the judgment in step 920 becomes "Yes," and the CPU 11*a* proceeds to step 925 so as to judge whether the judgment result indicates "normal." In this case, since the judgment result indicates "normal," the result of the judgment in step 925 becomes "Yes," and the CPU 11*a* proceeds to step 995 so as to end the present routine. Thus, the anomaly diagnosis for the automatic charging apparatus 10 on the basis of the dummy data is completed.

Next will be described the case in which the vehicle has been moved from the fixed position immediately after stoppage there. In such a case, although the CPU 21*a* awaits a response signal through the processing in steps 715 and 720 after the CPU 21*a* has transmitted a policing code at step 710 by virtue of the result of the judgment in step 705 being "Yes," the CPU 21*a* will not receive any response signal within a 5-sec period after the transmission of the policing code. Accordingly, the CPU 21*a* makes "Yes," judgment in step 715 and proceeds to step 795 so as to end the present routine.

Next will be described the case in which, for some reason (including the case in which the automatic charging apparatus 10 is in an anomalous state), the monitor apparatus 20 does not receive any charge result even through the monitor apparatus 20 has transmitted the dummy data. In such a case, although the CPU 21*a* awaits charge results through the processing in steps 730 and 735, the CPU 21*a* will not receive any charge result within a 10-sec period after the transmission of the dummy data. In such a case, the automatic charging apparatus 10 can be judged to be in an anomalous state. Accordingly, the CPU 21*a* makes "Yes," judgment in step 730 to proceed to step 755 so as to photograph the license plate of the vehicle and the driver (the vicinity of the driver's seat) (acquire images). Subsequently, the CPU 21*a* ends the present routine in step 795.

Next will be described the case in which the automatic charging apparatus 10 does not perform the charging processing properly and therefore must be judged to be in an anomalous state. In such a case, the charge results which the CPU 21*a* has calculated on the basis of the dummy data transmitted in the above-described step 725 do not match the charge results transmitted from the automatic charging apparatus 10. Therefore, the CPU 21*a* judges in step 740 that the automatic charging apparatus 10 is in an anomalous state, and in step 745 transmits a message indicating that the automatic charging apparatus 10 is in an anomalous state.

Subsequently, since the result of the judgment in step 750 becomes "No," the CPU 21*a* proceeds to step 760 so as to photograph the license plate of the vehicle and the driver (the vicinity of the driver's seat) (acquire images) as in step 755, and then proceeds to step 765 so as to store in the external memory 16 the ID code of the automatic charging apparatus 10 contained in the response signal. Subsequently, the CPU 21*a* proceeds to step 770 and transmits to the computer of the management center 30, via the communication circuit 25, image data of photographs obtained in the above-described step 760 and the ID code stored in the external memory 16 in the above-described step 765. Then, the CPU 21*a* ends the present routine in step 795.

Meanwhile, since the automatic charging apparatus 10 receives from the monitor apparatus the judgment result indicting that the automatic charging apparatus 10 is in an anomalous state, the result of the judgment in step 925 becomes "No," and the CPU 11*a* proceeds to step 930. In step 930, the CPU 11*a* records in the external memory 16 an anomaly record, which includes dummy data used and the present time. Subsequently, the CPU 11*a* proceeds to step 935 and warns the driver, via the display apparatus 14 and the sound apparatus 15, by way of providing a warning message indicating that "the automatic charging apparatus 10 is in an anomalous state." Subsequently, the CPU 11*a* proceeds to step 995 so as to end the present routine.

As described above, the present embodiment includes charge-amount calculation means (diagnosis calculation means) for calculating a charge amount on the basis of pseudo vehicle position information of the vehicle (see FIG. 5) and for transmitting the result of the calculation (see step 910 of FIG. 9). Since the result of the calculation performed by the charge-amount calculation means is information that corresponds to the internal status of the automatic charging apparatus 10, the automatic charging apparatus 10 of the present embodiment also includes transmission means for transmitting, to the outside of the vehicle, information corresponding to the internal status of the automatic charging apparatus (including information regarding the result of calculation which is performed on the basis of pseudo vehicle position information which is transmitted from the monitor apparatus 20 and serves as predetermined information) (see FIG. 9). Further, the monitor apparatus 20 of the present embodiment includes anomaly judgment means (step 740 of FIG. 7) which judges whether the automatic charging apparatus is in an anomalous state, on the basis of information transmitted from the transmission means of the automatic charging apparatus only when the vehicle stays at a predetermined position (step 705 of FIG. 7). Steps 710–720, 725, and 730 of FIG. 7 constitute a portion of the anomaly judgment means, and steps 750 to 770 of FIG. 7 constitute report means for reporting information regarding the vehicle (photographed image of the vehicle, ID of the automatic charging apparatus, etc.) to the outside (e.g., the management center 30) when the automatic charging apparatus 10 is judged to be in an anomalous state.

As described above, in the present embodiment, only when the vehicle stays at a fixed position in the vicinity of the monitor apparatus 20, the automatic charging apparatus 10 and the monitor apparatus 20 are caused to communicate with each other in order to judge presence/absence of an anomalous state. Therefore, the status of an automatic charging apparatus 10 of another vehicle is not misidentified as the status of an automatic charging apparatus 10 of a vehicle to be monitored. Further, since monitoring is performed while the vehicle is in a stopped state, the automatic charging apparatus 10 can be caused to perform complex calculation (in the embodiment, calculation of charge amounts on the basis of dummy data) which requires a relatively long calculation time and the judgment on whether or not the automatic charging apparatus 10 involves anomaly based on the result of the calculation is made. As a result, presence/absence of anomaly in the automatic charging apparatus 10 can be detected accurately.

The most important factor in relation to the function of the automatic charging apparatus 10 is correct calculation of charge amounts. In the present embodiment, since the presence/absence of anomaly in the automatic charging apparatus 10 is judged by use of a charge processing routine which is executed in an ordinary state (i.e., other than monitoring), the judgment as to presence/absence of anomaly becomes more significant.

The present invention is not limited to the above-described embodiment, and various modifications may be employed within the scope of the present invention. For example, the calculation that the automatic charging apparatus 10 is caused to perform for judgment as to presence/absence of anomaly is not limited to calculation of charge amounts by use of dummy data, and the automatic charging apparatus 10 may be configured to have a separate routine (diagnosis calculation means) for performing calculation while using data transmitted from the monitor apparatus and to transmit the result of the calculation to the monitor apparatus 20.

Further, the above-described step 705 of FIG. 7 may be replaced with a step in which the monitor apparatus 20 transmits a code to the automatic charging apparatus 10, and judges whether the vehicle has stopped at the predetermined position, on the basis of the result of a judgment as to whether the monitor apparatus 20 has received a response signal generated by the automatic charging apparatus 10 for the code (within a predetermined period of time after transmission of the code); or a step in which the monitor apparatus 20 detects positional change of the vehicle by use of an ultrasonic sensor or the like provided in the monitor apparatus 20 to thereby judge whether the vehicle has stopped at the predetermined position. Moreover, in place of or in addition to the above-described step 715 of FIG. 7, there may be provided a step in which the CPU of the monitor apparatus 20 proceeds to step 795 upon detection of an engine start pulse or a vehicle speed pulse. Furthermore, the anomaly record stored in step 930 of FIG. 3 may include a monitor apparatus ID code for specifying the monitor apparatus 20.

The charge information (entry charge information, and unit-distance charge information) exemplified by Tables 1 and 2 may be updated in the following manner. The management center 30 transmits the newest information to the automatic charging apparatus 10 by means of ground-wave radio communication; and the automatic charging apparatus 10 stores the newest information in the external memory 16 so as to update the charge information. In this case, the monitor apparatus 20 and the management center 30 must be configured in such a manner that the management center 30 transmits the same newest information to the monitor apparatus 20 as well; and the monitor apparatus 20 stores the newest information in the external memory 24 and, on the basis of the newest information and dummy data, obtains data to be compared with charge results transmitted from the automatic charging apparatus 10. Further, dummy data are not fixed data and may be changed freely by means of, for example, communication with the management center 30.

The types of charge are not limited to the above-described entry charge and distant charge. For example, charging may be performed in accordance with time over which a vehicle stays within the same area. Alternatively, charging may be performed in such a manner that time charge is applied when a vehicle travels at a speed less than a predetermined speed, and the above-described distance charge is applied when the vehicle travels at a speed greater than the predetermined speed.

The invention claimed is:

1. A system for monitoring an automatic charging apparatus for a vehicle, comprising:

an automatic charging apparatus mounted on the vehicle and including charge-amount calculation means for calculating an amount to be charged to the vehicle on the basis of at least position information representing a position of the vehicle; and a monitor apparatus disposed on the ground and adapted to monitor a status of said automatic charging apparatus, wherein said automatic charting apparatus and said monitor apparatus are configured to communicate with each other;

said automatic charging apparatus includes transmission means for transmitting, to the outside of the vehicle, information corresponding to an internal status of said automatic charging apparatus; and said monitor apparatus includes anomaly judgment means for judging whether said automatic charging apparatus is in at anomalous state, on the basis of the information transmitted from said transmission means of said automatic charging apparatus only when the vehicle stays at a predetermined position, wherein said anomaly judgment means of said monitor apparatus comprises vehicle-stoppage judgment means for judging whether the vehicle has stopped at the predetermined position.

2. A system for monitoring an automatic charging apparatus for a vehicle according to claim 1, wherein said transmission means of said automatic charging apparatus is configured to receive predetermined information transmitted from said monitor apparatus and transmit to said monitor apparatus information which relates to the result of calculation performed on the basis of the received information and serves as information representing the internal status of said automatic charging apparatus; and said anomaly judgment means of said monitor apparatus is configured to transmit the predetermined information to said automatic charging apparatus, receive the information transmitted from said transmission means of said automatic charging apparatus and relating to the result of the calculation, and judge whether said automatic charging apparatus is in an anomalous state on the basis of the received information relating to the result of the calculation.

3. A system for monitoring an automatic charging apparatus for a vehicle according to claim 2, wherein said monitor apparatus comprises report means for reporting information regarding the vehicle to the outside when said monitor apparatus judges that said automate charging apparatus is in an anomalous state.

4. A system for monitoring an automatic charging apparatus for a vehicle according to claim 1, wherein said charge-amount calculation means of said automatic charging apparatus is configured to use pseudo position information, which is transmitted from said monitor apparatus and which is representing a pseudo position of the vehicle, instead of said position information representing the actual position of the vehicle, in calculating the charge;

said transmission means of said automatic charging apparatus is configured to transmit to said monitor apparatus information which relates to the result of calculation of the charge amount performed on the basis of the pseudo position information and serves as information representing the internal status of said automatic charging apparatus; and said anomaly judgment means of said monitor apparatus is configured to transmit the pseudo position information to said automatic charging apparatus, receive the information transmitted from said transmission means of said automatic charging apparatus and relating to the result of the calculation, and judge whether said automatic charging apparatus is in an anomalous state on the basis of the received information relating to the result of the calculation.

5. A system for monitoring an automatic charging apparatus for a vehicle according to claim 4, wherein said anomaly judgment means of said monitor apparatus is configured to judge that said automatic charging apparatus is in an anomalous state when said anomaly judgment means does not receive the information transmitted from said automatic charging apparatus and relating to the result of the calculation, before a predetermined period of time elapses after transmission of pseudo position information representing position of the vehicle.

6. A system for monitoring an automatic charging apparatus for a vehicle according to claim 5, wherein said monitor apparatus comprises report means for reporting information regarding the vehicle to the outside when said monitor apparatus judges that said automatic charging apparatus is in an anomalous state.

7. A system for monitoring an automatic charging apparatus for a vehicle according to claim 4, wherein said monitor apparatus comprises report means for reporting information regarding the vehicle to the outside when said monitor apparatus judges that said automatic charging apparatus is in an anomalous state.

8. A system for monitoring an automatic charging apparatus for a vehicle according to claim 1, wherein said monitor apparatus comprises report means for reporting information regarding the vehicle to the outside when said monitor apparatus judges that said automatic charging apparatus is in an anomalous state.

9. A system for monitoring an automatic charging apparatus for a vehicle comprising:

an automatic charging apparatus mounted on the vehicle and including charge-amount calculation means for calculating an amount to be charged to the vehicle on the basis of at least position information representing a position of the vehicle; and a monitor apparatus disposed on the ground and adapted to monitor a status of said automatic charging apparatus, wherein said automatic charging apparatus and said monitor apparatus are configured to communicate with each other;

said charge-amount calculation means is configured to calculate the charge amount by determining a present area in which the vehicle is present on the basis of position information representing an actual position of the vehicle and area information specifying each area;

said automatic charging apparatus includes transmission means for transmitting, to the outside of the vehicle, information corresponding to an internal status of said automatic charging apparatus;

said monitor apparatus includes anomaly judgment means for judging whether said automatic charging apparatus is in an anomalous state, on the basis of the information transmitted from said transmission means of said automatic charging apparatus only when the vehicle stays at a predetermined position;

said charge-amount calculation means of said automatic charging apparatus is configured to use pseudo position information, which is transmitted from said monitor apparatus and which is representing a pseudo position of the vehicle, instead of said position information representing the actual position of the vehicle, in calculating the charge amount;

said transmission means of said automatic charging apparatus is configured to transmit to said monitor apparatus information which relates to the result of calculation of the charge amount performed on the basis of the pseudo position information and serves as information representing the internal status of said automatic charging apparatus; and said anomaly judgment means of said monitor apparatus is configured to transmit the pseudo position information to said automatic charging apparatus, receive the information transmitted from said transmission means of said automatic charging apparatus and relating to the result of the calculation, and judge whether said automatic charging apparatus is in an anomalous state on the basis of the received information relating to the result of the calculation.

10. A system for monitoring an automatic charging apparatus for a vehicle according to claim 9, wherein said anomaly judgment means of said monitor apparatus is configured to judge that said automatic charging apparatus is in an anomalous state when said anomaly judgment means does not receive the information transmitted from said automatic charging apparatus and relating to the result of the calculations before a predetermined period of time elapses after transmission of pseudo position information representing position of the vehicle.

11. A system for monitoring an automatic charging apparatus for a vehicle according to claim 10, wherein said monitor apparatus comprises report means for reporting information regarding the vehicle to the outside when said monitor apparatus judges that said automatic charging apparatus is in an anomalous state.

12. A system for monitoring an automatic charging apparatus for a vehicle according to claim 9, wherein said monitor apparatus comprises report means for reporting information regarding the vehicle to the outside when said monitor apparatus judges that said automatic charging apparatus is in an anomalous state.

13. A system for monitoring an automatic charging apparatus for a vehicle, comprising:

an automatic charging apparatus mounted on the vehicle and including charge-amount calculation means for calculating amount to be charged to the vehicle by determining a present area in which the vehicle is present on the basis of position information representing an actual position of the vehicle and area information specifying each area; and a monitor apparatus, including anomaly judgment means, disposed on the ground and adapted to monitor a status of said automatic charging apparatus, wherein said automatic charging apparatus and said monitor are configured to communicate with each other;

said charge-amount calculation means of said automatic charging apparatus is configured to receive pseudo position information, which is transmitted from said monitor apparatus and which is representing position of the vehicle, calculate the charge amount on the basis of the received pseudo position information instead of said position information representing the actual position of the vehicle, and transmit to said monitor apparatus information which relates to the result of the calculation; and said anomaly judgment means of said monitor apparatus is configured to transmit the pseudo position information to said automatic charging apparatus, receive the information transmitted from said automatic charging apparatus and relating to the result of the calculation, and judge whether said automatic charging apparatus is in an anomalous state on the basis of the received information relating to the result of the calculation.

14. A system for monitoring an automatic charging apparatus for a vehicle according to claim 13, wherein said anomaly judgment means of said monitor apparatus is configured to judge that said automatic charging apparatus is in an anomalous state when said anomaly judgment means does not receive the information transmitted from said automatic charging apparatus and relating to the result of the calculation, before a predetermined period of time elapses after transmission of pseudo position information representing position of the vehicle.

15. A system for monitoring an automatic charging apparatus for a vehicle according to claim 14, wherein said monitor apparatus comprises report means for reporting information regarding the vehicle to the outside when said monitor apparatus judges that said automatic charging apparatus is in an anomalous state.

16. A system for monitoring an automatic charging apparatus for a vehicle according to claim 13, wherein said monitor apparatus comprises report means for reporting information regarding the vehicle to the outside when said monitor apparatus judges tat said automatic charging apparatus is in an anomalous state.

17. An automatic charging apparatus mounted on the vehicle and including charge-amount calculation means for calculating amount to be charged to the vehicle by determining a present area in which the vehicle is present on the basis of position information representing an actual position of the vehicle and area information specifying each area, said apparatus comprising:

communication means for communicating with a monitor apparatus disposed on the ground and adapted to judge whether the automatic charging apparatus is normal; and diagnosis calculation means for receiving via said communication means predetermined dummy data which is transmitted from said monitor apparatus only when the vehicle stays at a predetermined position, performing calculation on the basis of the received, predetermined dummy data, and transmitting information regarding the result of the calculation to said monitor apparatus via said communication means.

18. An automatic charging apparatus mounted on the vehicle and including charge-amount calculation means for calculating amount to be charged to the vehicle by determining a present area in which the vehicle is present on the basis of position information representing an actual position of the vehicle and area information specifying each area, said apparatus comprising:

communication means for communicating with a monitor apparatus disposed on the ground and adapted to judge whether the automatic charging apparatus is normal, wherein said charge-amount calculation means is configured to receive via said communication means pseudo position information transmitted from said monitor apparatus, calculate the charge amount on the basis of the received pseudo position information instead of said position information representing the actual position of the vehicle, and transmit information relating to the result of die calculation to said monitor apparatus via said communication means.

19. A monitor apparatus disposed on the ground and adapted to judge whether an automatic charging apparatus is in an anomalous state, said automatic charging apparatus being mounted on a vehicle and adapted to calculate amount to be charged to the vehicle by determining a present area in which the vehicle is present on the basis of position information representing an actual position of the vehicle and area information specifying each area, said monitor apparatus comprising:

communication means for communicating with said automatic charging apparatus; and anomaly judgment means for transmitting pseudo position information to said automatic charging apparatus via said communication means, receiving via said communication means information relating to the result of charge-amount calculation which is performed by said automatic charging apparatus on the basis of the pseudo position information instead of the position information representing the actual position of the vehicle, and judging whether said automatic charging apparatus is an anomalous state, on the basis of the received information relating to the result of the calculation.

20. A monitor apparatus according to claim 19, wherein said anomaly judgment means transmits the pseudo position information to said automatic charging apparatus only when the vehicle has stopped at a predetermined position.

* * * * *